INVENTOR.
EWELL W. FORKNER

March 20, 1956  E. W. FORKNER  2,739,019
CONNECTING ROD BEARING AND LUBRICATING MEANS THEREFOR
FOR PUNCH AND BLANKING PRESSES AND THE LIKE
Filed July 27, 1953  2 Sheets-Sheet 2

INVENTOR.
EWELL W. FORKNER
BY
Zugelter & Zugelter
Attys.

United States Patent Office 2,739,019
Patented Mar. 20, 1956

2,739,019

CONNECTING ROD BEARING AND LUBRICATING MEANS THEREFOR FOR PUNCH AND BLANKING PRESSES AND THE LIKE

Ewell W. Forkner, Cincinnati, Ohio, assignor to Precision Flexopress Corporation, Cincinnati, Ohio, a corporation of Ohio Application July 27, 1953, Serial No. 370,558

2 Claims. (Cl. 308—121)

This invention relates to connecting rod bearings designed particularly for the crankshafts of punch and blanking presses and the like, and more particularly to a lubricating device for said connecting rod bearing.

An object of this invention is to provide a bearing for a connecting rod, that is coupled to the crank of the crankshaft of presses, and which is provided with a novel means for providing adequate lubrication for that bearing.

A further object of the invention is to provide a connecting rod bearing, in which that portion of the rod which contains one-half of the bearing, is provided with a lubricant reservoir that communicates by means of passageways to the surface of the bearing, the bearing having a slot for housing a capillary means that is continuous through the passageways to the reservoir, whereby lubricant can be adequately supplied by capillary action to the bearing.

Other objects of the invention will be apparent to those of ordinary skill in the art to which the invention pertains, from the following description taken in conjunction with the accompanying drawings.

Figure 1:
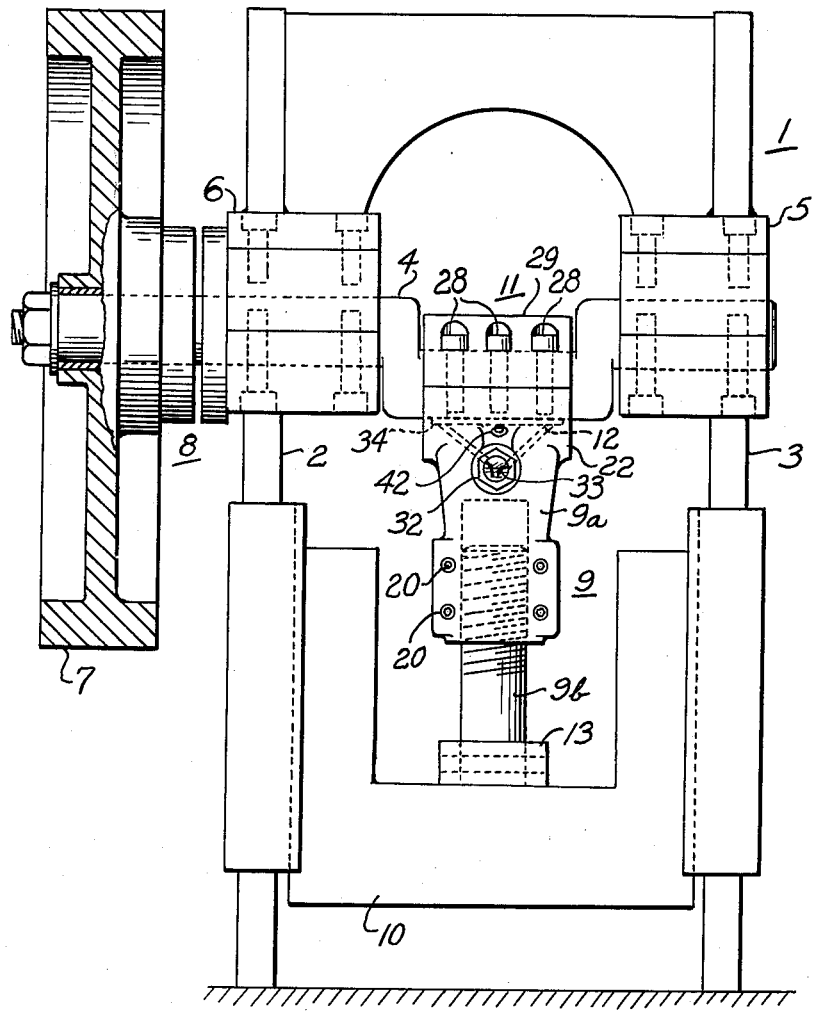
Figure 1 is a more or less diagrammatic view of a press having a crankshaft and flywheel therefor, and a connecting rod for connecting the crank of the crank shaft to the plunger or ram of the press.

In Fig. 1 of the drawings is schematically illustrated a punch press or blanking press 1, having side frame members 2 and 3, on which is supported a crankshaft 4. The crankshaft 4, as shown, is journalled in main bearings 5 and 6, carried by the side frame members 2 and 3. The crankshaft is provided with the usual flywheel 7, and a clutch mechanism 8 for engaging or disengaging the shaft and flywheel. The clutch mechanism 8 may be of usual or known construction, and forms no part of the invention.

The crank of crankshaft 4 is connected by a connecting rod 9 to the ram 10 of the press. The upper end of the connecting rod is provided with a bearing 11, having built into the same a lubricating means 12, the details of which will be more fully described infra in connection with the description of Figs. 2, 3 and 4.

As shown in the several views of the drawing, the connecting rod 9 is made in two parts, 9a and 9b. Part 9b connects part 9a to a wrist pin bearing 13, by which the rod is connected to the plunger or ram 10. Part 9a includes a shank portion 14, which is hollow, split as at 15, and internally threaded to receive the upper end of part 9b. Portion 14 is provided with flanges 16 and 17, that have threaded holes 18 and 19 for receiving cap screws 20. The cap screws are tightened when the connecting rod has been adjusted to length, whereby the split portion 14 grips and securely clamps to the connecting rod portion 9b.

The upper end of the shank 14 terminates in a head 22, in which one-half of the connecting rod bearing for the crank of shaft 4 is formed, that bearing being indicated at 23. As shown, the top of head 22 is flat, and that flat surface is coincident with the horizontal diameter of the bearing. On each side of the bearing surface 23 the head 22 is provided with a plurality of threaded holes 25 and 26, for receiving cap screws 27 and 28, respectively, by means of which the upper half, or cap 29, of the bearing is secured to the head 22.

Figure 2:
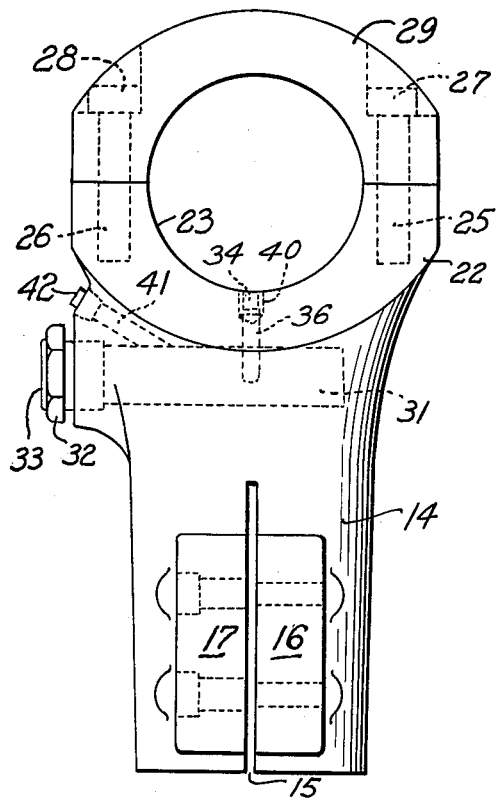
Fig. 2 is a view in side elevation of the upper portion of the connecting rod shown in Fig. 1, which portion includes the bearing and the lubricating means therefor.
Figure 4:
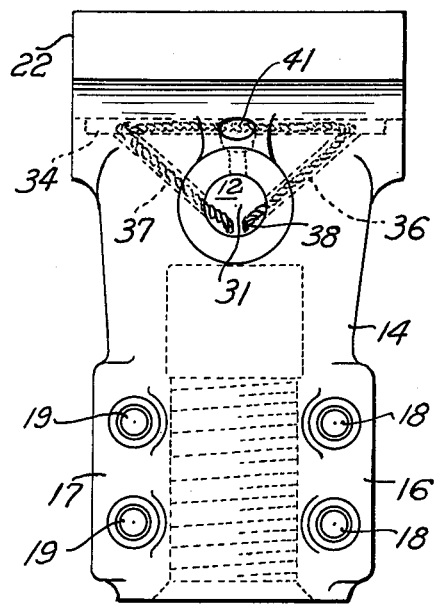
Fig. 4 is a view in front elevation of the arrangement shown in Fig. 2.

The lubricating means 12, for the bearing surfaces of the head 22 and the cap 29, is illustrated more particularly in Figs. 2 and 4. As there shown, the lubricating means comprises a reservoir 31 in the top of the shank 14, but below the bearing surface 23. The reservoir 31 is formed by boring a hole from the front face of the connecting rod part 9a, the bore being terminated adjacent the opposite side thereof. As shown, reservoir 31 is substantially at right angles to a vertical plane containing the longitudinal axis of the connecting rod bearing. The forward or open end of bore 31 is closed by a screwed cap 32, having in the center thereof a window 33, by means of which the interior of bore 31 is visible, and whereby the level or quantity of lubricant in the reservoir may be sighted.

Figure 3:
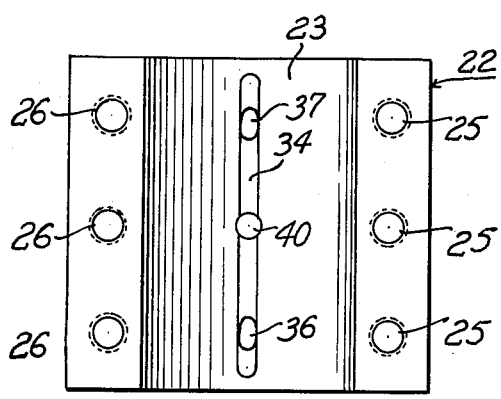
Fig. 3 is a top plan view of Fig. 2.
Figure 5:
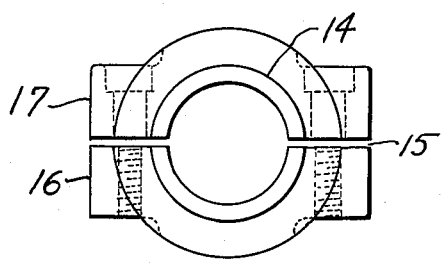
Fig. 5 is a bottom plan view of the arrangement shown in Figs. 2 and 4.

The lubricating means includes a slot 34, formed in the bottom of the bearing surface 23. That slot extends substantially the full length of the bearing surface, as shown in Figs. 3 and 4, respectively, and is in communication with the reservoir 31, by means of passageways 36 and 37. Passageways 36 and 37 are drilled at an angle from a point adjacent the respective ends of the slot 34, into the lubricating reservoir 31, as shown in Fig. 4. The lubricating means 12 includes, also, a capillary means 38 that extends from the reservoir 31 through the passageways 36 and 37 and along the slot 34. The capillary means may comprise a wick of suitable twisted fabric strings that are threaded through either passageway 36 or 37, laid in the slot 34, and then passed back through the other passageway into the reservoir. The twisted wick lies in the groove 34, and in practice wipes the surface of the crank of the crankshaft, as the crankshaft turns.

At approximately the center of the slot 34 is a blind hole 40, the diameter of which is slightly greater than the width of slot 34. The blind hole 40 provides an auxiliary well, so to speak, at the center of the oiling groove 34, in which the lubricant may accumulate and be squeezed out onto the bearing surfaces as the bearing pressure is applied when the crankshaft is revolving and work is being done by the ram 10.

In order that the reservoir 31 may be filled without disturbing the sight gauge cap 32, a filling hole 41 is drilled through the front of the crankshaft part 9a, in a location preferably directly above the reservoir bore. This filling hole 41 may be closed by a screw cap 42. When reservoir 31 is charged with lubricant through the filler hole 41, the machinist can observe the level to which the lubricant rises therein, by viewing the lubricant through the sight glass 33.

A connecting rod provided with a crankshaft bearing, and a lubricating means such as illustrated and described, requires a comparatively small amount of lubricant because it is supplied to the bearing surfaces gradually and as needed. The lubricant reservoir being closed, except through the capillary member 38, and being below the crankshaft, it will be apparent that lubricant will not be lost by being thrown out by centrifugal force, or by splashing, if the bearing is fitted properly.

Having thus described the invention, it will be apparent to those skilled in this art, that various modifications and changes may be made in the illustrated embodiment thereof, without departing from either the spirit or the scope of the invention.

Therefore, what is claimed as new and desired to be secured by Letters Patent is:

1. A crankshaft connecting rod bearing for presses, said bearing being provided with a built-in lubricating device, and comprising a shank to which a connecting rod may be attached, and having at its upper end a half crankshaft bearing provided with a bearing surface and to which a cap containing the other half of the bearing surface may be attached, said shank having in its upper portion but below the half-bearing thereof, a reservoir for liquid lubricant, said reservoir comprising a cylindrical bore disposed at substantially a right angle to a vertical plane containing the longitudinal axis of the half-bearing, one end of said bore terminating at the outer surface of the connecting rod shank, and a closure cap removably secured in the outer end of said bore, said half-bearing having a slot in said bearing surface extending lengthwise thereof, said half-bearing having passageways connecting the ends of said slot to said reservoir, and capillary means extending along said slot and through said passageways into the reservoir for conveying lubricant therefrom to the surface of said bearing.

2. A lubricating means for a connecting rod having a half-bearing for the crank of a crankshaft, said half-bearing having a bearing surface, and a cap having a half-bearing secured to said rod half-bearing, a lubricating means for said bearing in the connecting rod below the half-bearing thereof, said lubricating means comprising a cylindrical bore in the connecting rod below said half-bearing and disposed at substantially a right angle to a vertical plane containing the longitudinal axis of the bearing surface and forming a reservoir for a liquid lubricant, one end of the bore terminating at the outer surface of the connecting rod, and a closure cap removably secured in the outer end of said bore, a slot in and extending lengthwise of the bearing surface of said half-bearing, passageways in said rod connecting said slot at spaced points to said reservoir, and capillary wick means in said slot, the end portions of said wick means extending through said passageways into said reservoir for conveying lubricant to the bearing surface of said connecting rod half-bearing.

References Cited in the file of this patent

UNITED STATES PATENTS

| Number | Name | Date |
|---|---|---|
| 49,591 | Rice | Aug. 22, 1865 |
| 185,130 | Ranson | Dec. 5, 1876 |
| 557,496 | Duryea | Mar. 31, 1896 |
| 727,015 | Stanley | May 5, 1903 |
| 771,571 | Pearson | Oct. 4, 1904 |
| 1,339,308 | Van Norman | May 4, 1920 |
| 1,399,861 | Hoff | Dec. 13, 1921 |
| 2,184,925 | Jabelmann et al. | Dec. 26, 1939 |